(12) United States Patent
Saito et al.

(10) Patent No.: US 7,068,882 B2
(45) Date of Patent: Jun. 27, 2006

(54) OPTICAL FIBER MICROLENS, OPTICAL FIBER AND METHOD OF POSITIONING OPTICAL FIBER

(75) Inventors: Masahiro Saito, Yuzawa (JP); Norihiko Ito, Yuzawa (JP); Nobuo Imaizumi, Adachi-ku (JP); Toshimichi Sato, Adachi-ku (JP)

(73) Assignee: Namiki Seimitsu Houseki Kabushiki Kaisha, Tokyo (JP)

(*) Notice: Subject to any disclaimer, the term of this patent is extended or adjusted under 35 U.S.C. 154(b) by 144 days.

(21) Appl. No.: 10/069,868

(22) PCT Filed: Jul. 4, 2001

(86) PCT No.: PCT/JP01/05810

§ 371 (c)(1),
(2), (4) Date: Aug. 7, 2002

(87) PCT Pub. No.: WO02/03112

PCT Pub. Date: Jan. 10, 2002

(65) Prior Publication Data

US 2003/0048987 A1    Mar. 13, 2003

(30) Foreign Application Priority Data

Jul. 4, 2000   (JP) ............................. 2000-202822

(51) Int. Cl.
*G02B 6/32*   (2006.01)

(52) U.S. Cl. ......................................... 385/33; 385/123
(58) Field of Classification Search ................... 385/33
See application file for complete search history.

(56) References Cited

U.S. PATENT DOCUMENTS

| 4,243,399 A | 1/1981 | Khoe et al. |
| 5,256,851 A | 10/1993 | Presby |
| 5,455,879 A * | 10/1995 | Modavis et al. ............... 385/33 |

FOREIGN PATENT DOCUMENTS

| EP | 215713 A2 | 3/1987 |
| EP | 260742 A1 | 3/1988 |
| EP | 916976 A1 | 5/1999 |
| GB | 2077943 A | 12/1981 |
| JP | 63-163806 A | 7/1988 |
| JP | 8-21921 A | 1/1996 |

* cited by examiner

*Primary Examiner*—John R. Lee
*Assistant Examiner*—Phillip Johnston
(74) *Attorney, Agent, or Firm*—Nixon Peabody LLP; Donald R. Studebaker

(57) ABSTRACT

The invention provides a single-mode optical fiber microlens with an anamorphic means of convergence, which has a core (2) and cladding (4), the core (2) extending along the central axis (3) of the optical fiber, at the tip of which there is a wedge shape with slanting faces is formed on the tip of the optical fiber 1 that faces the light source or radiated beam, as well as 2nd inclines at the angle θ to a plane perpendicular to the central axis of the optical fiber and lengthwise to the wedge-shaped tip.

7 Claims, 9 Drawing Sheets

| curvature radius Rv (y-direction) [μm] | curvature radius Rh (x-direction) [μm] | | | | | | | | | | | CLF(∞) |
|---|---|---|---|---|---|---|---|---|---|---|---|---|
| | 6 | 7 | 8 | 9 | 10 | 10.5 | 11 | 11.5 | 12 | 13 | 14 | 15 | |
| 3 | 63.76 | 67.92 | 71.65 | 75.02 | 77.76 | 78.82 | 79.65 | 80.25 | 80.62 | 80.75 | 80.21 | 79.19 | 76.21 |
| 3.5 | 71.48 | 76.12 | 79.68 | 82.64 | 84.97 | 85.86 | 86.53 | 86.99 | 87.24 | 87.16 | 86.45 | 85.27 | 81.98 |
| 4 | 76.55 | 81.99 | 85.60 | 88.24 | 90.15 | 90.83 | 91.32 | 91.62 | 91.73 | 91.42 | 90.53 | 89.21 | 85.67 |
| 4.5 | 79.10 | 85.49 | 89.40 | 91.87 | 93.43 | 93.93 | 94.25 | 94.38 | 94.35 | 93.81 | 92.75 | 91.31 | 87.59 |
| 5 | 79.48 | 86.87 | 91.24 | 93.72 | 95.05 | 95.40 | 95.57 | 95.57 | 95.41 | 94.67 | 93.45 | 91.91 | 88.07 |
| 5.5 | 78.20 | 86.49 | 91.40 | 94.04 | 95.27 | 95.52 | 95.58 | 95.47 | 95.21 | 94.30 | 92.97 | 91.4 | 87.44 |
| 6 | 75.72 | 84.75 | 90.21 | 93.11 | 94.36 | 94.56 | 94.55 | 94.37 | 94.04 | 93.00 | 91.59 | 89.92 | 86.00 |
| 6.5 | 68.81 | 82.04 | 88.01 | 91.21 | 92.56 | 92.77 | 92.74 | 92.52 | 92.14 | 91.03 | 89.57 | 87.88 | 83.97 |
| 7 | 64.96 | 78.70 | 85.09 | 88.61 | 90.13 | 90.36 | 90.34 | 90.12 | 89.73 | 88.59 | 87.10 | 85.42 | 81.56 |
| 7.5 | 64.96 | 75.02 | 81.72 | 85.54 | 87.54 | 87.54 | 87.55 | 87.35 | 86.97 | 85.84 | 84.36 | 82.69 | 78.92 |
| 8 | 61.12 | 71.20 | 78.12 | 82.19 | 84.09 | 84.45 | 84.52 | 84.35 | 84.00 | 82.91 | 81.46 | 79.83 | 76.17 | area A, area B

OPTICAL FIBER MICROLENS, OPTICAL FIBER AND METHOD OF POSITIONING OPTICAL FIBER

FIELD OF INDUSTRIAL USE

This invention concerns a laser diode used in optical communications, particularly an optical light source such as an elliptical radiation source, and a single mode or multiple mode optical fiber microlens formed at the end of an optical fiber; it also concerns an optical coupling to the optical fiber and a method of positioning the optical fiber.

PRIOR ART

Such things as laser diodes (LD) and light-emitting diodes are use as light sources for optical communications; generally the end of an optical fiber is aligned with and coupled to the light-emitting face in order to introduce the light into the optical fiber what will be the transmission path. However, the angle of radiation of light from the light-emitting face is quite broad, and so the efficiency of coupling with the optical fiber is not too good. Accordingly, there is a method of improving the coupling efficiency by inserting a microlens to converge the beam and improve the efficiency of light injection into the optical fiber. This method has long been combined with the method of inclining the microlens relative to the optical fiber in order to control the losses from backward reflection during injection of the beam into the optical fiber. This has involved a method of polishing the endface of the optical fiber itself at an angle, or a method of aligning the optical fiber at an angle to the light-emitting surface during alignment of the optical fiber and the LD.

The article "Efficient Power Coupling from a 980 nm, Broad-Area Laser to a Single-Mode Fiber Using a Wedge-Shaped Fiber Endface" by Virendra S. Shah et al. published in the September 1990 issue of the Journal of Lightwave Technology (vol 8 no 9) proposed an optical fiber microlens with an anamorphic means of convergence in order to effectively couple a beam radiated from an asymmetrical light source. The article proposed a wedge-shaped lens capable of yielding a coupling efficiency of 47%. In this case, the wedge angle θ was 25°. The angle θ is the angle of intersection between the wedge face and a plane perpendicular to the long axis of the optical fiber, which is the central axis of the core.

Figure 14:
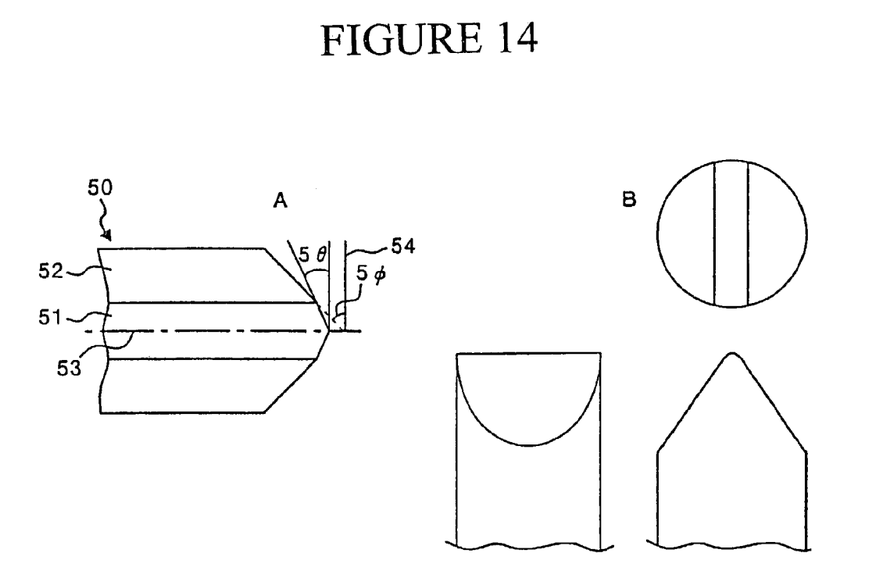

JPO Unexamined Patent Publication No. H8-5865 of 1996 proposed a double wedge microlens that used an anamorphic means of convergence at the fiber end, with the purpose of coupling an elliptical mode optical beam in a single-mode optical fiber (see FIG. 14A). In FIG. 14A, 50 is the optical fiber, 51 is the core, 52 is the cladding, and the optical fiber axis 53 and the plane 54 are in a perpendicular relationship. And the relationship 5θ<5φ exists.

JPO Unexamined Patent Publication No. H8-86923 of 1996, which has the same applicants as the present application, describes an optical fiber end that faces the light source that is wedge-shaped, with two slanted faces centered on the central axis of the core, the tip forming semicylindrical lenses with the desired curvature. FIG. 14B is a three-plane projection of the optical fiber tip.

These proposals are used with a high-power 980 nm LD that is used to excite an erbium doped fiber amplifier (hereafter EDFA). This is characterized by a markedly elliptical output radiation pattern with an aspect ration of 4:1 or greater. Circular asymmetrical lenses using flat lenses or some other an anamorphic means of convergence are also used in the case of a strained lattice quantum well laser, in order to spread the beam radiation window sideways and improve the coupling efficiency.

Microlenses that use this an anamorphic means of convergence have been used with high-power LD that have an elliptical, asymmetrical output radiation pattern, and clearly are effective in the aspect of coupling efficiency. However, if coupling efficiency is over-emphasized, the high-power LD with an asymmetrical high-power output pattern is directly affected by backward reflection, and there is a probability of changes in the output radium spectrum across a broad range. When there is excessive backward reflection to the EDFA 980 nm LD mentioned above, the excitation radiation is twisted outside the absorption range of Erbium and the amplification function is greatly affected. These problems were pointed out by C. R. Giles et al in "Reflection-Induced Changes in the Optical Spectra of 980-nm QW Lasers," *IEEE Photonics Technology Letters*, vol. 6, no. 8 of August 1994.

In the calculations of the inventors of this application, if the line of the tip of the optical fiber makes an angle of 90 with the axis of the optical fiber, even a double wedge-shaped optical fiber microlens will produce a backward reflection level of about −30 dB. Backward reflection at this level would certainly cause a great influence on the amplification function of the high-power LD described above.

One means of resolving these effects of backward reflection is the method of incorporating a Bulk lattice or fiber lattice reflector in the optical fiber module. This brings about improvement by controlling the reflection and restricting it to a narrow range. However, this reflector equipment is too expensive to use in optical fiber modules. A separate method proposed in JPO Unexamined Patent Publication No. H10-78531 of 1998 is a new optical fiber microlens that has the purpose of reducing backward reflection while increasing the coupling efficiency of the LD and the optical fiber.

Figure 15:
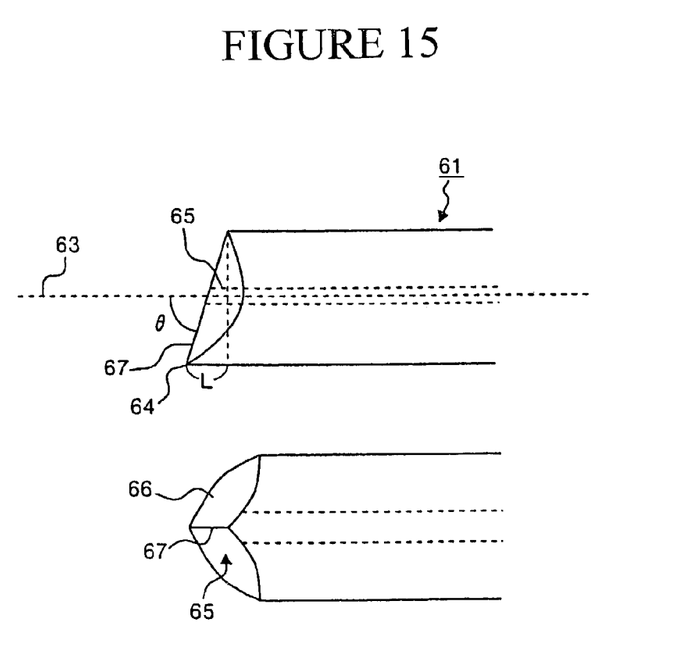
FIG. 15 is the side view and top view of a conventional optical fiber microlens with a slanted tip.

According to that application, in extremely small optical fiber lenses, the challenge is to increase the coupling efficiency between the optical fiber and a laser diode with asymmetric output, and to reduce the level of backward reflection to the laser diode from the extremely small lens. The solution is achieved as shown in FIG. 15, where the line of intersection 67 of two flat surfaces 65, 66 at the wedge-shaped tip of the optical fiber 61 forms the long axis of an extremely small lens 64, and the line of intersection 67 is positioned at an angle (θ) of less than 90° with the axis 63 of the optical fiber.

This method certainly has the effect of reducing the level of backward reflection and thus reducing the amount of beam reflection attenuation, but in the aspect of coupling efficiency, there is a cost in positioning of the LD and optical fiber. First the line of intersection 67 of the two flat surfaces 65, 66 is calculated so as to form the long axis of the extremely small lens 64, and the extremely small lens is established at the tip of the optical fiber at an angle θ that is less than 90° between the line of intersection and the axis of the optical fiber, or in other words at a slanting angle. Therefore, of course, the laser beam from the LD is refracted on entry. The remaining difficulty of coupling the LD and the optical fiber, in the case of an extremely small lens which is an optical fiber with such an angle at its tip, is in the point of whether to position the LD at an angle to the optical fiber matching the index of refraction, or instead to just position the optical fiber at a slant. In any event, if the tip forms a slanted angle, the angled portion will be pointed at the central core and will create a distance from the LD (the angle is labeled L in FIG. 15). For that reason, it is hard to accomplish optimum position of the LD and the optical fiber.

Therefore, the present invention has the purpose of improving the coupling efficiency between an optical fiber microlens, or an optical fiber alone, and a 980 nm LD used to excite an Erbium doped fiber amplifier (EFDA), a strained lattice quantum well laser or other high-power LD with asymmetrical output, and to reduce the amount of backward reflection from the microlens to the LD, consequently reducing as much as possible the amount of beam reflection attenuation of the optical fiber endface, and at the same time providing an optical fiber microlens, optical fiber and optical fiber positioning method that is capable of very high efficiency coupling.

PRESENTATION OF INVENTION

The optical fiber microlens of this invention is an optical fiber microlens that has a core and cladding, and that has an anamorphic means of convergence at its tip, in which at the optical fiber tip that faces the light source or radiated beam a 1st pair of inclined surfaces is formed in a positional relationship such that they intersect in a wedge shape, and on the axis of a plane perpendicular to the axis of the optical fiber along the center of the core are formed 2nd inclined surfaces at the angle θ to a plane perpendicular to the central axis of the optical fiber and lengthwise to the wedge-shaped tip.

The anamorphic means of convergence of this invention efficiently concentrates the beam from a high-power laser diode or other source into the core.

The optical fiber of this invention is an optical fiber with the tip processed as a curved surface, in which the curved surface is a portion of an elliptical surface, and one major axis of the elliptical surface matches the central axis of the core.

In this invention, the surface of the tip is a portion of the surface of an ellipsoid, and so the beam from a high-power laser diode or other light source is efficiently concentrated in the core.

Further, the optical fiber of this invention is one with the tip processed as a curved surface, in which the intersection of the curved surface with each of two perpendicular planes that contain the central axis of the core is an arc, each with a specified radius.

In this invention, because the tip has a curved surface with two ratios of curvature, the light from the high-power laser diode or other light source is concentrated efficiently on the core. Now, the intersection of the arcs provides a smooth curved surface that is symmetrical with respect to the core.

The optical fiber of this invention has a curved surface on the core portion of the tip, and the cladding portion has planes that extend from the curved surface and that are symmetrical with respect to the central axis.

In this invention, the beam that is output from the laser diode, including the light that enters the cladding portion, is concentrated efficiently in the core.

In the optical fiber of this invention, the ratio of the curvature radii of the arcs is between 1.2 and 3.8.

In this invention, the beam from the high-power laser diode is concentrated in the core at a rate equal to or better than an optical fiber that has a concentration function because the tip of the core is processed into a cylindrical shape.

Further, in the optical fiber of this invention, the ratio of the curvature radii of the arcs is between 1.8 and 2.4.

In this invention, the beam is concentrated in the core with high efficiency.

In the optical fiber of this invention, the ratio of the smaller of the curvature radii of the arcs to the core radius is between 1.3 and 2.6.

In this invention, the beam from the high-power laser is concentrated at a rate equal to or better than an optical fiber that has a concentration function because the tip of the core is processed into a cylindrical shape.

In the optical fiber of this invention, the ratio of the smaller of the curvature radii of the arcs to the core radius is between 1.6 and 1.9.

In this invention, the beam is concentrated in the core with greater efficiency.

In the method of positioning optical fiber of this invention, when the light beam that enters from a given light source forms an elliptical flat shape on the plane that is in contact with the tip of the optical fiber, the optical fiber is positioned by rotating the axis so that the central axis of the core matches the direction of travel of the centerline of the light beam, and a line tangent to the largest curvature in the core tip is perpendicular to the long direction of the flat shape.

BRIEF EXPLANATION OF DRAWINGS

FIGS. 14A and B show a conventional wedge-shaped optical fiber microlens.

OPTIMUM MODE OF IMPLEMENTATION

Modes of implementation of this invention are described below. In the first mode of implementation, the optical fiber microlens is explained from the perspective of reducing backward reflection; in the second mode of implementation, the optical fiber and optical fiber positioning method are explained in terms of improving the coupling efficiency (that is, concentrating the beam in the core with high efficiency).

First Mode of Implementation

In the first mode of implementation, the invention is explained in detail in terms of reduction of backward reflection. First there is an explanation, with reference to drawings, of the method of manufacture to shape the optical fiber microlens. After that is a detailed explanation of the shape, again with reference to the drawings.

In the manufacture of the optical fiber microlens, first the tip of the optical fiber is ground to form a wedge shape in accordance with JPO Unexamined Patent Publication No. H8-86923 of 1996, which has the same applicants as the present application. The purpose, needless to say, is to form a single-mode optical fiber and microlens with an anamorphic means of convergence. With reference to FIGS. 1 through 4, the inclined surfaces A, A' are first formed by grinding to a wedge shape (see FIG. 14B). Now, according to the calculations of the inventors, when the wedge is shaped, the wedge angle can be set at any desired angle from 50 degrees to 120 degrees. The central portion of the wedge shaped tip is further ground to the angle θ. This angle θ is calculated with respect to plane x, which is in a radial relationship to the lengthwise axis of the optical fiber. This grinding at angle θ is continued to center point T, to form a curved surface with a gentle ridge line. This provides an optical fiber microlens characterized by the symmetrical formation of new surfaces a, a' on the wedge-shaped tip.

The amount of attenuation from reflection is considered next. Generally when the reflected beam (backward reflection) is great, the multiple reflection between connectors and the return to the laser bring on a loss of transmission characteristics. The amount of reflection attenuation is one of the most important indices of the characteristics between connectors. The main factor in generation of this reflected light is Fresnel reflection that arises at the ground endface. The extent of the Fresnel reflection depends on the cutting angle of the optical fiber endface; over 6 degrees there is no reflection that can be measured with an optical time domain reflectometer (OTDR). On one hand, the greater the curvature of the tip of the wedge of the optical fiber lens, the higher the level of backward reflection will be. The wedge-shaped tip in this application is not simply the connection of two surfaces with a curved ridge; in order to further reduce the level of backward reflection, the tip has second surfaces a, a' that are inclined at the angle θ.

Figure 1:
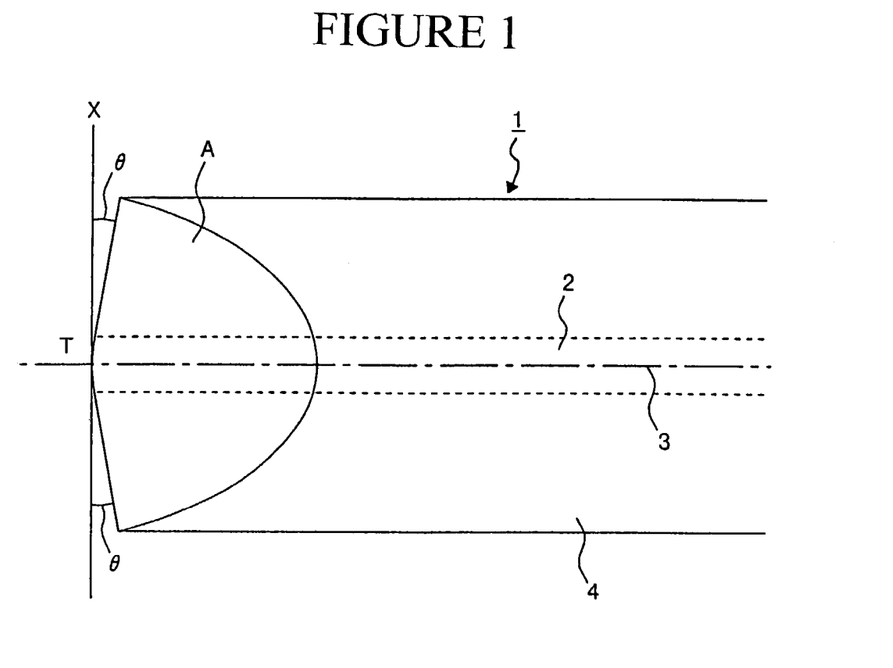
FIG. 1 is a top view of an optical fiber microlens showing one implementation of this invention.
Figure 2:
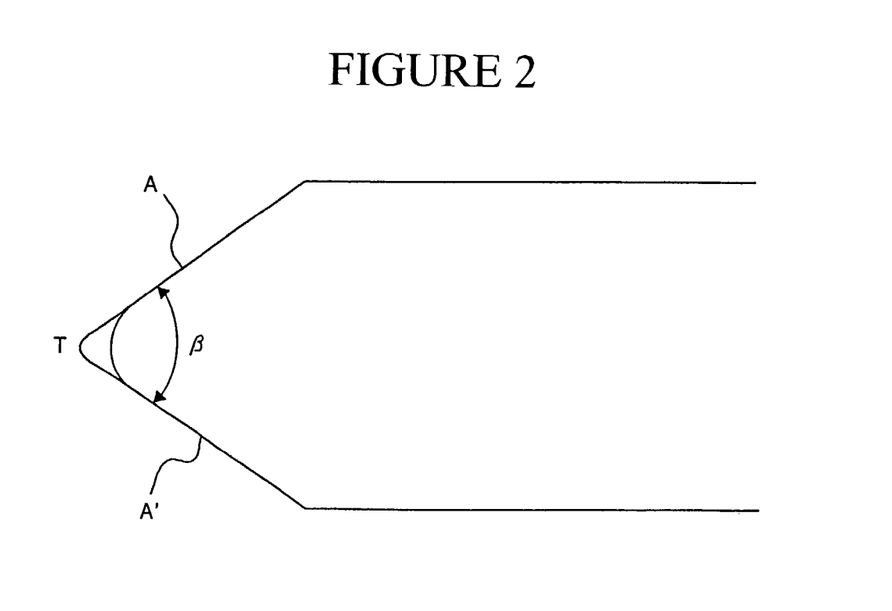
FIG. 2 is a side view of an optical fiber microlens showing one implementation of this invention.
Figure 3:
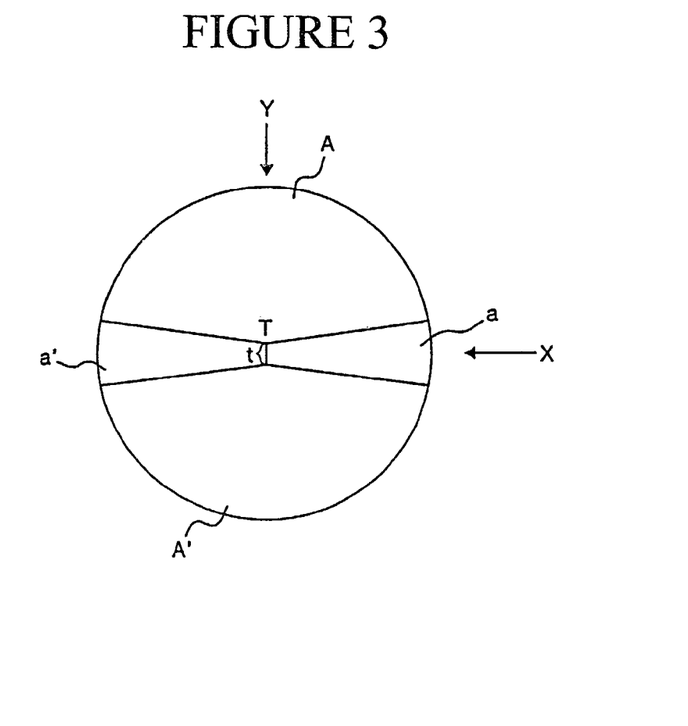
FIG. 3 is a front view of an optical fiber microlens showing one implementation of this invention.
Figure 4:
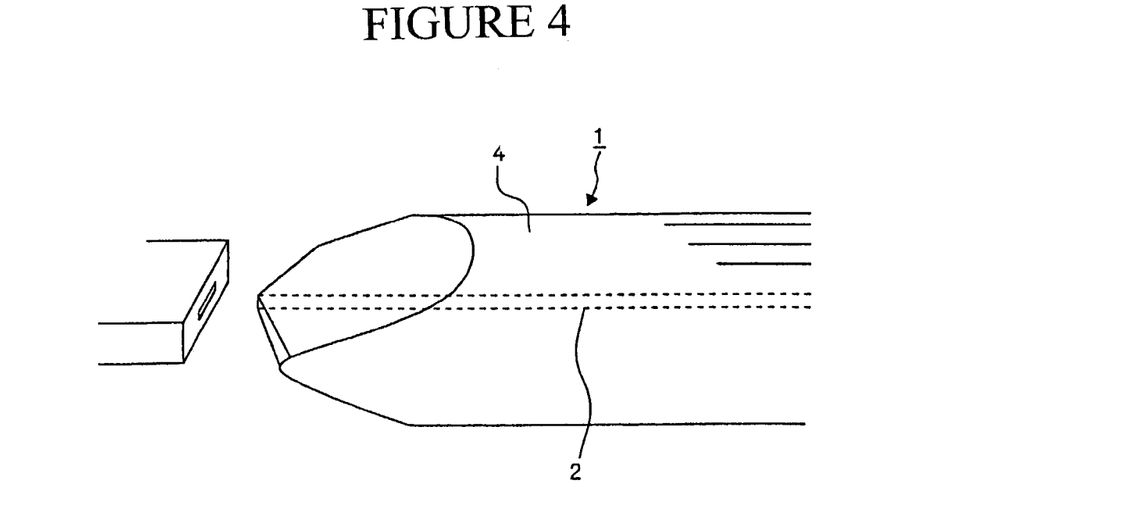
FIG. 4 is a simplified oblique view of an optical fiber microlens showing one implementation of this invention.
Figure 5:
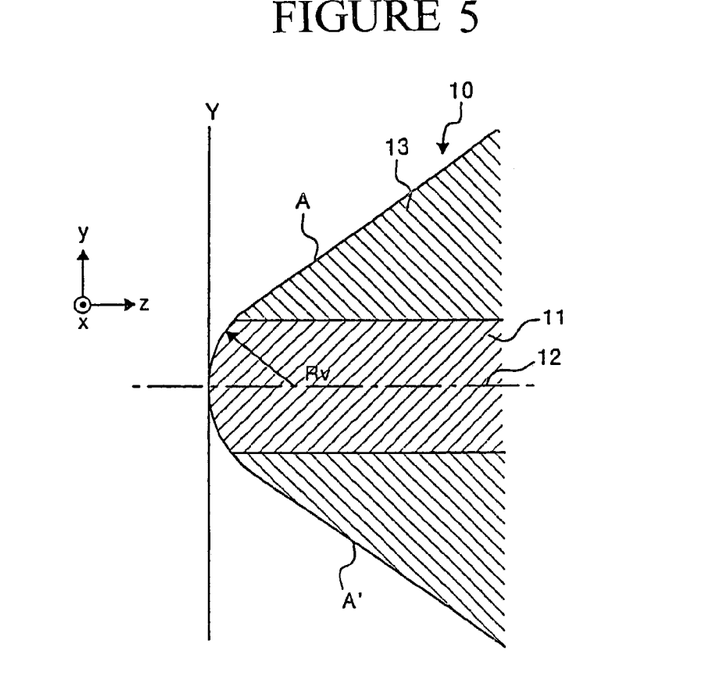
FIG. 5 is an explanatory drawing centered on the core portion of the tip of an optical fiber of the second mode of implementation.
Figure 6:
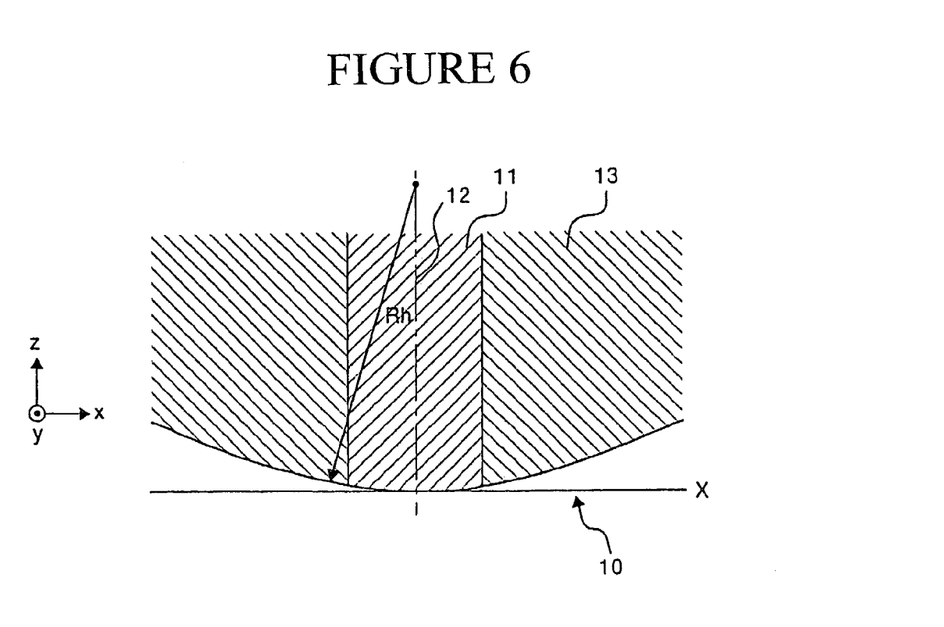
FIG. 6 is an explanatory drawing centered on the core portion of the tip of an optical fiber of the second mode of implementation.

Next, this invention is explained with reference to FIGS. 1 through 4. FIGS. 1 through 4 are one example of implementation of this invention. FIG. 1 is a top view of the optical fiber microlens of this invention. FIG. 2 is a side view of an optical fiber microlens showing one implementation of this invention. FIG. 3 is a front view of an optical fiber microlens showing one implementation of this invention. FIG. 4 is a simplified oblique view of an optical fiber microlens showing one implementation of this invention.

An optical fiber basically has a cylindrical structure consisting of a core with a high index of refraction covered by cladding material with a low index of refraction. A regularized frequency number V is used as a quantity expressing the number of modes that can be carried. For multiple mode fibers, V is several tens or more, and mode numbers of several hundred are possible. On the other hand, V drops as the core diameter or the difference in relative indices of refraction is reduced. In a step-type fiber where V=2.4 or less, only one code can be carried; this is a single-mode fiber as used in this invention.

In FIGS. 1 through 4, 1 is the optical fiber, 2 is the core shown by broken lines, 3 is the lengthwise optical fiber axis, and 4 is the cladding. A, A' are smooth, symmetrical and equal surfaces that form a wedge shape on the optical fiber. Similarly, a, a' are a second set of symmetrical and equal surfaces ground at the angle θ. T in FIG. 3 is the center point of the optical fiber microlens, and t is the radius of curvature of the microlens.

In FIGS. 1 through 4, the wedge-shaped optical fiber 1 is further ground at the angle θ at the center of the wedge-shaped tip. This angle θ is measured from a plane x that is in a radial relationship to the lengthwise axis of the optical fiber. This grinding at the angle θ continues nearly to the center so as to create a curved surface that is a gentle ridge. According to the inventors' calculations, the value of the angle can be from 2 degrees to 12 degrees, but is preferably 7 degrees or 8 degrees. When the angle θ is determined, the angle φ of the optical fiber itself will be from 176 degrees to 156 degrees. Now, the radius R of the optical fiber 1 is 125 μm. Now, depending on the output power of the laser beam and the relationship of the optical fiber radius and the core radius, θ should be an angle from 20 degrees to 30 degrees. In that case, φ will be an angle from 120 degrees to 140 degrees.

In FIG. 3, t is the radius of curvature of the microlens, but t will vary with the angle of laser radiation from the LD or other light-emitting surface. For example, this application assumes a 980 nm pump laser module or other high-power LD, but the radiating window of an LD emitter is flat, and often measures 0.5 to 1 μm vertically (along y axis) and 2 to 6 μm horizontally (along x axis). In this case, with the FFP radiation angle from 25 degrees to 45 degrees, (this will vary with the core diameter, but in the case of an ordinary single-mode optical fiber with a core diameter of 5 μm to 6 μm) the radius of curvature t of the microlens will have a value from 5 μm to 6 μm.

This provides an optical fiber microlens characterized by the formation of symmetrical new second surfaces a, a' at the center point T of the wedge-shaped tip. In contrast to the optical fiber microlens with angular inclines shown in FIG. 15, this optical fiber microlens does not have the distance L shown in FIG. 15, and so it can be positioned easily, with its core easily aligned with the center of the LD radiation window.

The distance between the LD and tip T will depend on calculations involving the radiation angle; even when a distance of 3 μm to 5 μm is required, it is more easily positioned that an optical fiber microlens inclined at an angle, and there is a reduced possibility of damaging either the LD or the optical fiber through contact between them.

Second Mode of Implementation

The improved coupling efficiency of the optical fiber and the method of position the optical fiber are explained next. FIGS. 5 through 8 are explanatory figures centered on the core portion of the tip of the optical fiber in the second mode of implementation. The shape of the tip of the optical fiber will be explained by means of a summarized explanation of the method of grinding the optical fiber.

First, the optical fiber 10 is ground to provide roundness to its tip. In parallel with this action, the cladding portion 13 is ground so that planes A, A' that connect to the rounded tip are symmetrical with respect to the central axis of the core 11. These planes A, A' are related to the positioning of the wedge shape (see FIG. 5).

Next the direction of grinding is changed 90 degrees, and the tip is ground so as to have a roundness perpendicular to the planes of the first ground surfaces. This roundness is ground so as to be larger than the roundness of the first grinding (see FIG. 6). Further, this second grinding is done so that the planes a, a' that connect to the rounded tip (see FIG. 9) are symmetrical with respect to the central axis 12.

Figure 7:
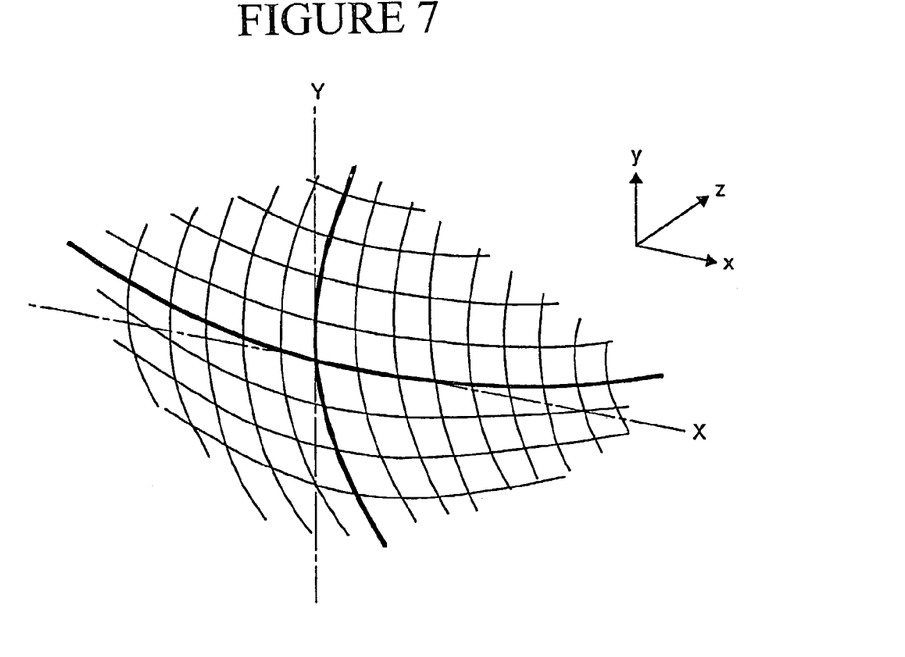
FIG. 7 is an explanatory drawing showing that the tip of the optical fiber has a surface that is a portion of an ellipsoid.
Figure 8:
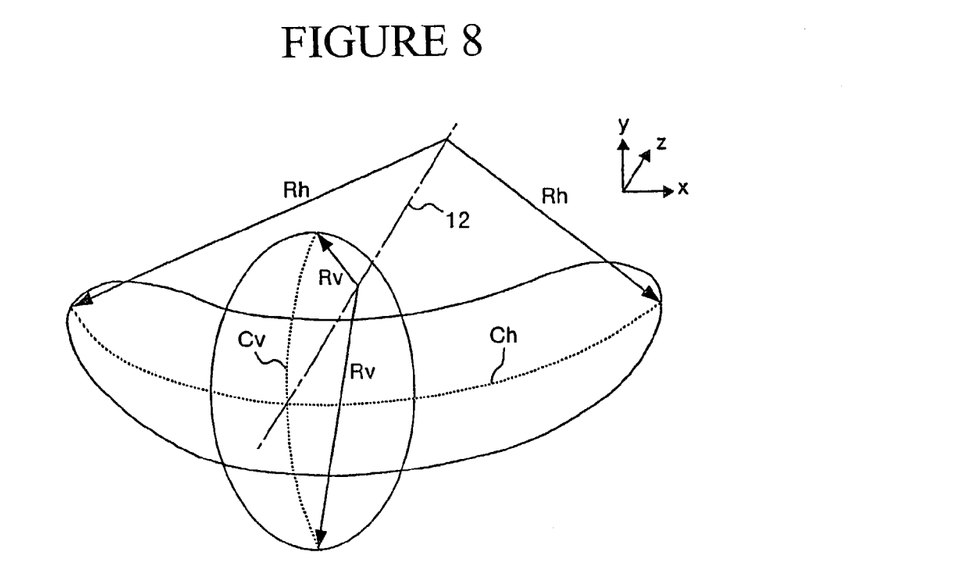
FIG. 8 is an explanatory drawing showing the state of the core tip, in which an arc of radius Rh is described in the y plane and an arc of radius Rv is described on the x plane.

FIGS. 7 and 8 are explanatory drawings that show the three-dimensional rounded surface at the tip of the optical fiber 10, including the core 11, following the two grinding processes. Of these, FIG. 7 shows the state in which the tip of the optical fiber 10 has become a partial ellipsoid surface. Using the coordinate system shown in FIG. 7, the ellipsoid surface can be expressed with certain coefficients p, q, r in formula (1) below:

$$(x/p)^2+(y/q)^2+(z/r)^2=1 \quad (1)$$

Now, p, q, r are not necessarily all different; any two can be the same. In that case, the formula (1) represents a rotated elliptical surface.

Now, it is possible to change the method of grinding so that the shape of the tip of the optical fiber 10 would be described by identical arcs if cut by a plane parallel to the central axis 12. FIG. 8 is an explanatory drawing showing the shape of the tip of the core 11, describing an arc of radius Rh on the y plane and an arc of radius Rv on the x plane. The figure shows arc Ch on the y plane and arc Cv on the x plane.

In the example explained above, the shape of the surface of the tip of the optical fiber 10 is explained using a surface that is a portion of an ellipsoid (FIG. 7) or using a combination of arcs with different radii of curvature (FIG. 8). Because of the very small realm of the tip of the core 11, the curved surfaces of the two systems of expression are almost the same.

Figure 9:
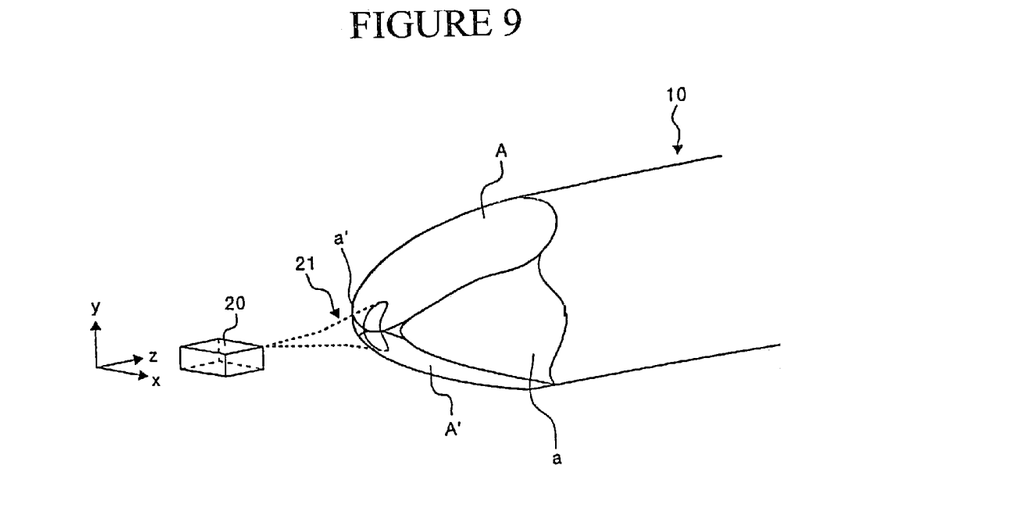
FIG. 9 is an explanatory drawing modeling the beam convergence of the laser beam radiated by a semiconductor laser.
Figure 10:
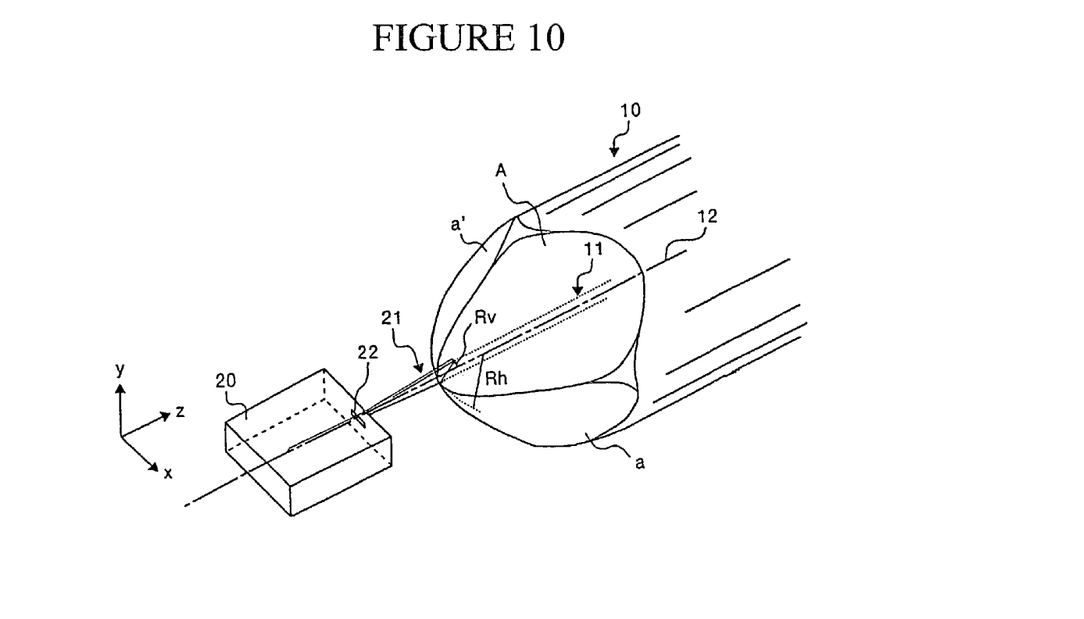
FIG. 10 is an explanatory drawing showing an example of the positioning of an optical fiber and a semiconductor laser.

The method of positioning the optical fiber is explained next. FIGS. 9 and 10 are explanatory drawings showing an example of the positions of an optical fiber and a semiconductor laser. Of these, FIG. 9 is an explanatory drawing that shows a model of the shape of the beamflux of a laser beam radiated from a semiconductor laser. Now, at this point the use of a high-power semiconductor laser is explained.

The semiconductor laser 20 radiates a high-power laser beam, and the radiation window 22 has the shape of a narrow rectangle, in the direction of the x axis (see FIG. 10). When a high-power laser beam is radiated from the radiation window 22, it becomes a flat laser beam spread in the direction of the y axis. The inventors of the present application have discovered a position of the optical fiber 10 in which the laser beam can be coupled with high efficiency. This position is achieved by first matching the direction of the center line of the light beam radiated by the semiconductor laser 20 (the laser beam direction) with the central axis 12 of the core 11, and then adjusting the position so the line of greatest curvature (the arc Ch in FIG. 8) of the core 11 matches the direction of the x axis in FIG. 9 or 10. In other words, it was discovered that a high-efficiency coupling is possible when the direction of the flat spread of the laser beam and the direction of the line of the arc Ch are in a perpendicular relationship.

The shape of the tip of the optical fiber 10 that allows high-efficiency coupling is explained next. As stated previously, the three-dimensional curved surface of the tip of the optical fiber 10 is characterized by a double curvature. The inventors performed experiments in which they measured coupling efficiency while varying the two radii of curvature Rh and Rv shown in FIGS. 5 and 6. A 980 nm pumping laser diode was used in the experiments, and numerical values were calculated on the basis of a core diameter of 2.90 [μm], a core index of refraction of 1.485, and a numerical aperture (NA) of 0.14. The core radius is labeled Rc below.

Figure 11:
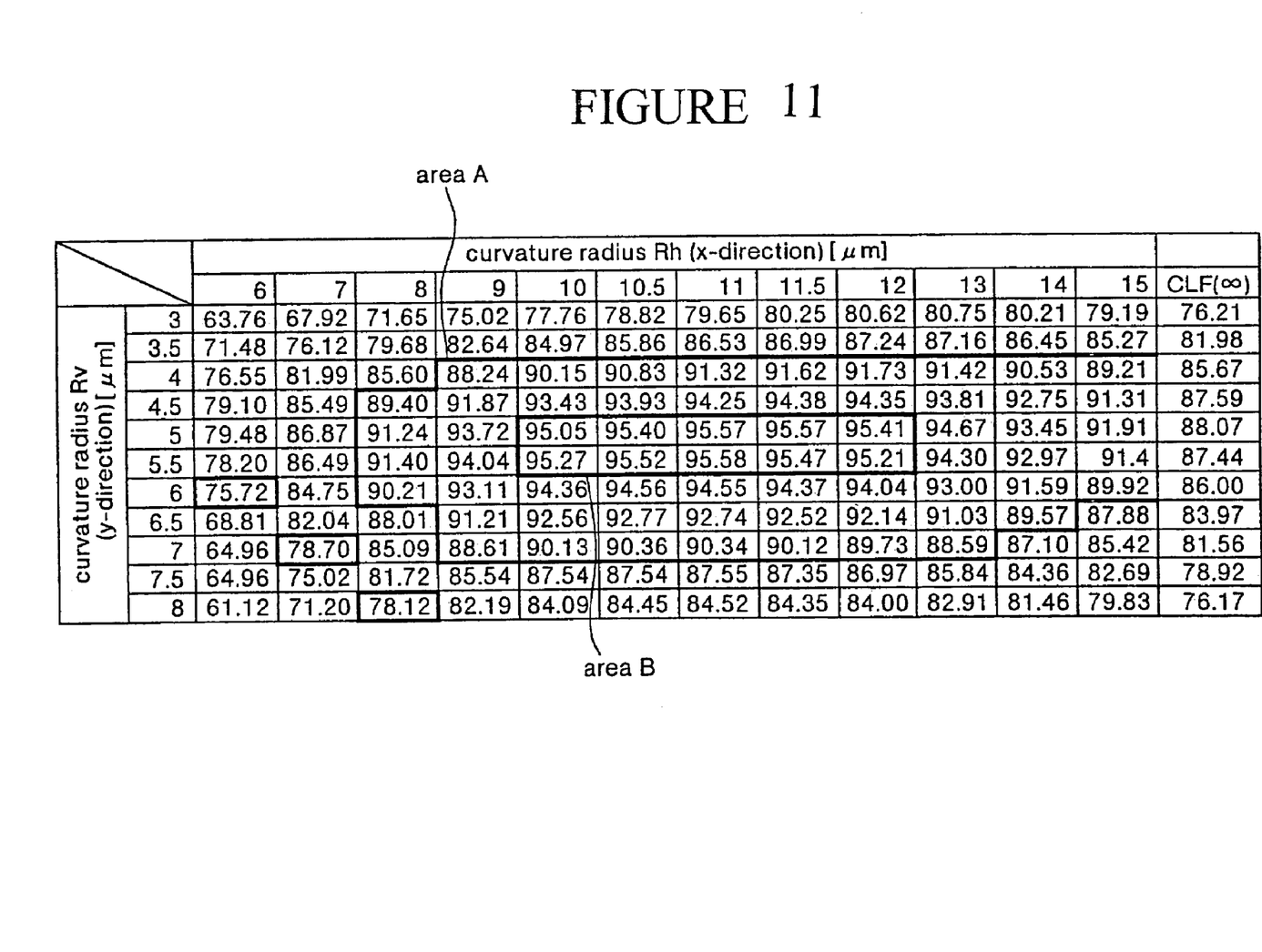
FIG. 11 is a table showing the coupling efficiency with Rh and Rv as variables.
Figure 12:
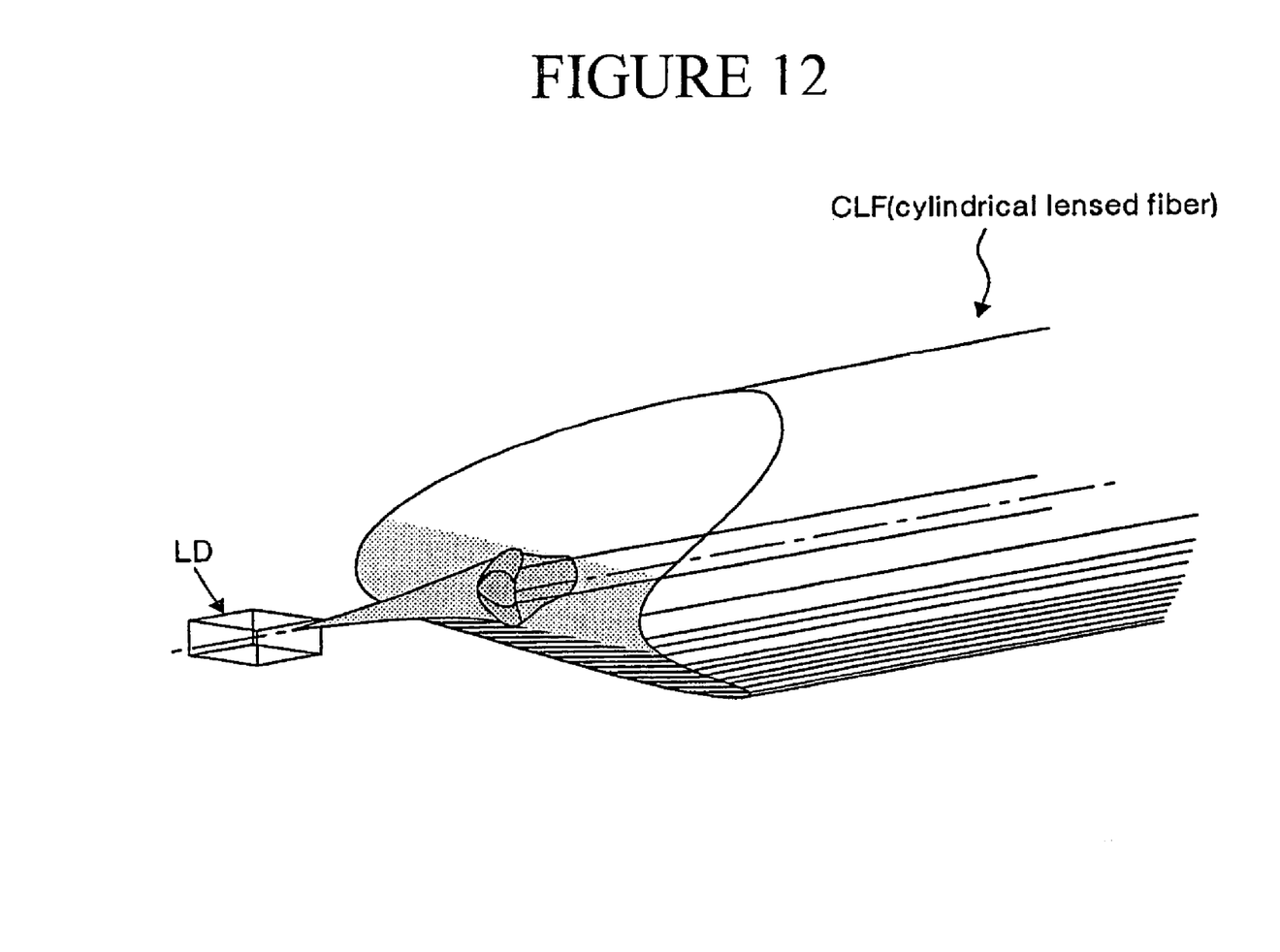
FIG. 12 is an external view of a traditional optical fiber with the tip processed in the shape of a semicylindrical lens.

FIG. 11 is a table showing the coupling efficiency when Rh and Rv are varied. Now, the column at the right edge of the table shows the coupling efficiency of an optical fiber processed as a single cylindrical lens. FIG. 12 is an external view of an optical fiber with the tip processed as a conventional cylindrical lens. In the following discussion this an optical fiber with the tip processed as a conventional cylindrical lens is called a cylindrical lensed fiber (CLF). Now, a CLF can be thought of as having a limited Rv but an Rh of unlimited size.

As shown in the table, the area A surrounded by heavy lines indicates coupling efficiencies greater than 88.07%, which is the greatest coupling efficiency in a CLF. From that it can be seen that the method of optical fiber positioning and the three-dimensional curved surface tip of this invention is far superior. In this are A, the value of the ration of radii of curvature (Rh/Rv) is always between 1.2 and 3.8. Further, the ratio of Rv (the smaller of the radii of curvature) and the core radius Rc (Rv/Rc) is always a value between 1.6 and 1.9.

Based on the results above, it is known that the shape of the tip of the optical fiber 10 is preferably $1.3 \leq Rv/Rc \leq 2.6$ with $1.2 \leq Rh/Rv \leq 3.8$, and better yet $1.6 \leq Rv/Rc \leq 1.9$ with $1.8 \leq Rh/Rv \leq 2.4$.

Now, it was learned that in the event that Rv and Rh are equal, so that the tip of the optical fiber 10 is part of a spherical surface, and are about double the core radius Rc (in the example in FIG. 11, Rh=Rv=7 [μm]), the coupling efficiency will be about 79% at the most. Moreover, if the tip of the optical fiber 10 has the core exposed as a hemisphere (that is, if Rv and Rh are equal to Rc), the coupling efficiency is less than 40%. From that it can be seen how efficiently the optical fiber and optical fiber positioning method of this invention concentrate and guide the beam.

Figure 13:
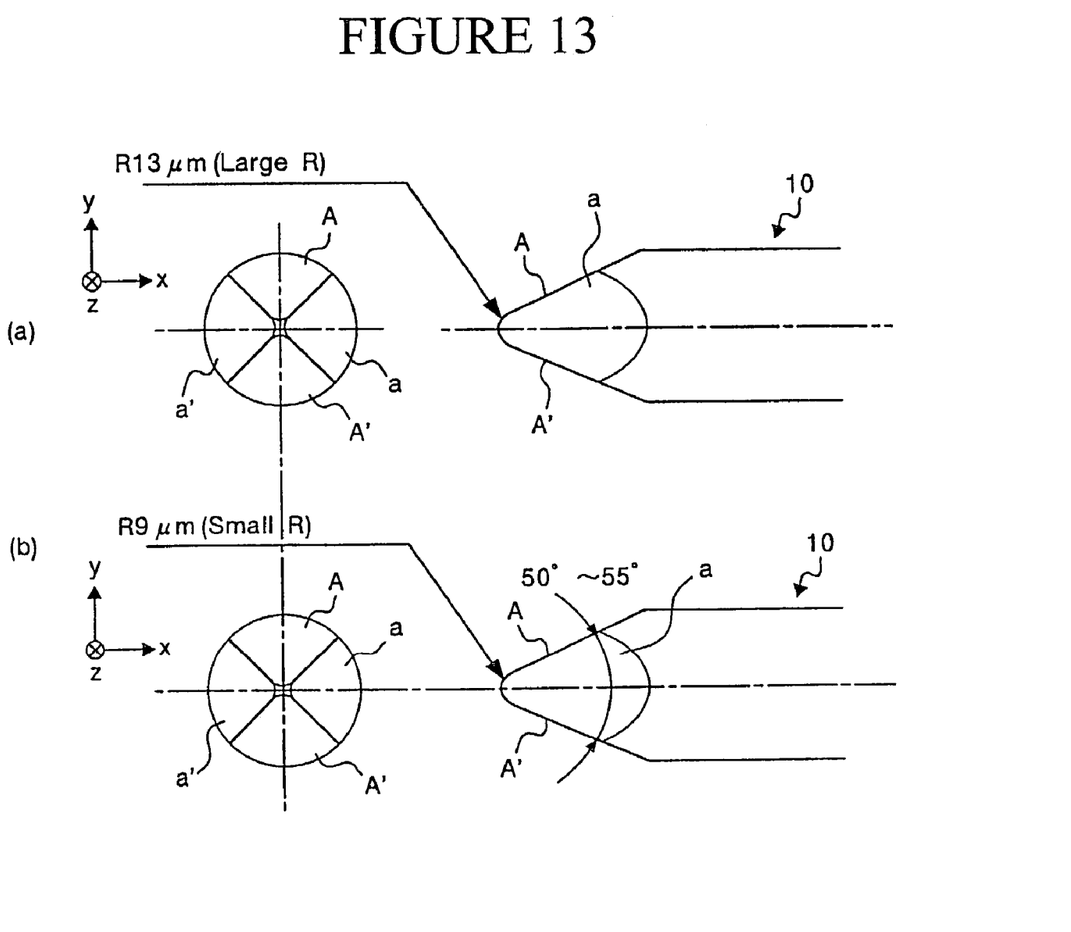
FIG. 13 is a diagram showing another example of an optical fiber with the tip processed in the shape of a semicylindrical lens.

Now, FIG. 13 is a diagram showing another example of processing the shape of the tip of the optical fiber 10. The left side of this figure shows the optical fiber 10 from the direction of the z axis.

As was explained above, the constitution of the optical fiber microlens of this invention makes it possible to reduce the level of backward reflection even in the case of a flat beam with a markedly elliptical output beam radiation pattern like that of the 980 nm high-power LD, which makes it possible to obtain a high coupling efficiency. In other words, this invention has the effect of making it possible to couple optical fiber with high efficiency and without leakage, while reducing attenuation from backward reflection in a beam produced by a LED or a high output LD such as a pump laser module with a flat radiation end.

The explanation above stated the effect with regard to a large aspect ratio like that of a 980 nm pump laser, but the invention is not limited to that, and is also effective for low aspect ratio LD, such as the light source for a raman amplifier.

Moreover, because the wedge-shaped optical fiber is ground at both ends, in contrast to an optical fiber with an ordinary wedge-shaped tip with a semicylindrical ridge tip or one with an inclined ridge tip, there is no need to incline the high-power LD or to incline the optical fiber; rather, it is possible to align or position the optical fiber microlens with the center of the LD radiation window, making it easy to couple the two. This fact leads to improved coupling efficiency.

Further, as a secondary effect, even with the LD and the optical fiber placed at a distance from 3 μm to 5 μm, both ends of the optical fiber have been ground in the wedge shape, and so there is less chance of damage occurring through contact between the optical fiber and the LD, relative to an optical fiber with an ordinary wedge-shaped tip with a semicylindrical ridge tip or one with an inclined ridge tip.

It is also possible to provide the optical fiber microlens at a low cost, in that it is formed by grinding alone, with no complicated manufacturing process.

Potential for Industrial Use

As described above, the optical fiber microlens, optical fiber, and method of positioning optical fiber of this invention are effective in highly efficiently and stably coupling high-power laser beams used in optical communications, and are suited to application in environments for long-distance transmission and multiplexed transmission.

The invention claimed is:

1. An optical fiber microlens that has a core and cladding and at the tip an anamorphic means of convergence, in which at the optical fiber tip that faces the light source or radiated beam a first pair of inclined surfaces is formed in a positional relationship such that they intersect in a wedge shape,
   on the axis of a plane perpendicular to the axis of the optical fiber along the center of the core are formed second inclined surfaces at the angle θ to a plane perpendicular to the central axis of the optical fiber and lengthwise to the wedge-shaped tip, and wherein the tip of the optical fiber microlens is processed as a curved surface, in which the intersection of the curved surface with each of two perpendicular planes that contain the central axis of the core is an arc, each with a specified radius.

2. An optical fiber microlens as described in claim 1 above, in which the curved surface is on the core portion of the tip and the cladding portion has planes that extend from the curved surface and that are symmetrical with respect to the central axis.

3. An optical fiber microlens as described in claim 1 above, in which the ratio of the curvature radii of the arcs is between 1.2 and 3.8.

4. An optical fiber microlens as described in claim 1 above, in which the ratio of the curvature radii of the arcs is between 1.8 and 2.4.

5. An optical fiber microlens as described in claim 1 above, in which the ratio of the smaller of the curvature radii of the arcs to the core radius is between 1.3 and 2.6.

6. An optical fiber microlens as described in claim 1 above, in which the ratio of the smaller of the curvature radii of the arcs to the core radius is between 1.6 and 1.9.

7. A method of positioning an optical fiber in which, when the light beam that enters from a given light source forms an elliptical flat shape on the plane that is in contact with the tip of the optical fiber, the optical fiber is positioned by rotating the axis so that the central axis of the core matches the direction of travel of the centerline of the light beam, and a line tangent to the largest curvature in the core tip is perpendicular to the long direction of the elliptical flat shape.

* * * * *